Dec. 28, 1965 K. WIEHL ETAL 3,226,657

HALL MODULATOR HAVING MAGNETIC CIRCUIT WITH AIR GAP AND SIGNAL WINDING MOVABLE FOR ZERO BALANCING

Filed March 13, 1963

United States Patent Office 3,226,657

Patented Dec. 28, 1965

3,226,657
HALL MODULATOR HAVING MAGNETIC CIRCUIT WITH AIR GAP AND SIGNAL WINDING MOVABLE FOR ZERO BALANCING

Klemens Wiehl, Friedrich Kuhrt, and Hans-Joachim Lippmann, Nurnberg, Germany, assignors to Siemens-Schuckertwerke Aktiengesellschaft, Berlin-Siemensstadt and Erlangen, both in Germany, a corporation of Germany Filed Mar. 13, 1963, Ser. No. 264,978
Claims priority, application Germany, May 8, 1962, S 79,335
6 Claims. (Cl. 332—51)

Our invention relates to electronic modulating devices of the Hall-voltage generating type and will be described hereinafter with reference to the accompanying drawings in which.

Figure 3A:
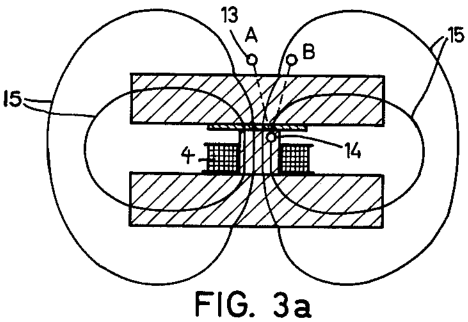
Figure 3B:
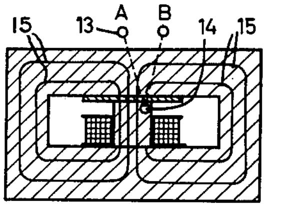
FIG. 3b PRIOR ART

FIGS. 3*a* and 3*b* are explanatory and show schematically respective sectional views of a modulator according to the invention and a modulator as previously known.

Figure 4:
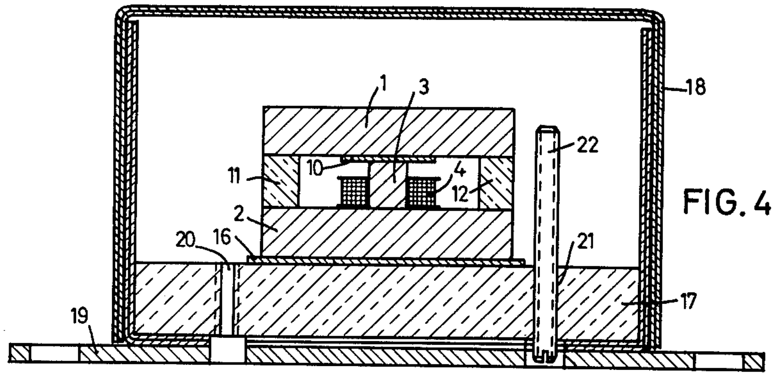

FIG. 4 is a sectional view of another modulator according to the invention; and

Figures 1, 2, 5:
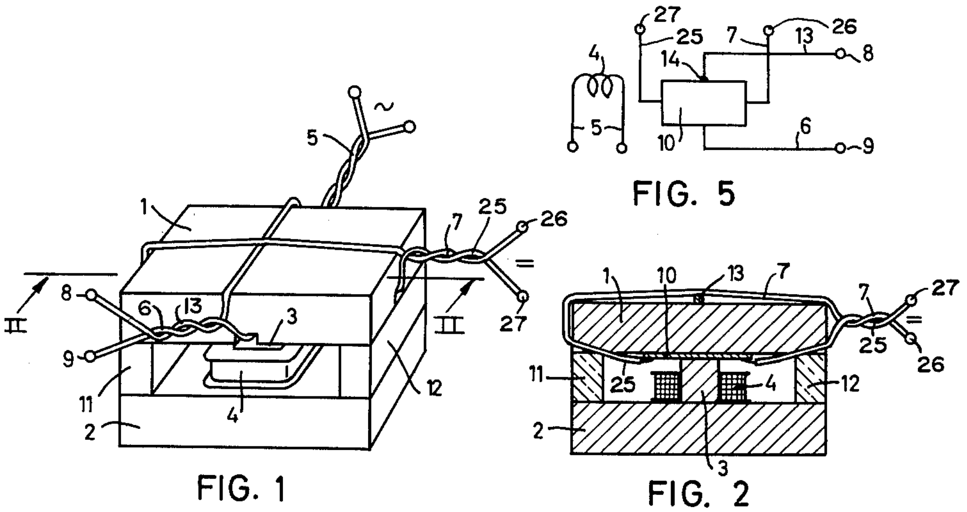
FIG. 1 is a schematic perspective view of a modulator according to the invention.
FIG. 2 is a sectional view of the same modulator.

FIG. 5 is an explanatory circuit diagram.

For a brief explanation of the modulating principle involved in devices of the type here dealt with, reference will first be had to FIG. 5. As shown, a Hall modulator comprises a so-called Hall plate 10 preferably consisting of a thin wafer or layer of semiconductor material such as indium antimonide or indium arsenide. The rectangular Hall plate is provided with current supply terminals on its respective narrow sides and carries probe electrodes, called "Hall electrodes," on its respective long sides, one of the Hall electrodes being denoted by 14. The Hall plate is located in the field gap of a magnetic circuit energized by a coil 4 whose leads are denoted by 5. The plate terminals are supplied with control current through leads 7 and 25 from a current source having terminals 26 and 27. The Hall electrodes are connected with output terminals 8 and 9 by respective leads 13 and 6.

During operation, the carrier current or voltage to be modulated, such as direct current or low-frequency alternating current, is passed through the plate 10 by means of its current terminals. The modulating signal is applied to the leads 5 of the coil 4, and the generated modulated output voltage is available between terminals 8 and 9. The function of the coil and the plate-current supply may also be reversed so that the carrier current to be modulated is supplied to the coil 4 and the modulating signal to the terminals of the Hall plate. By means of such a modulator, small direct current signals can be converted into alternating current of a desired frequency having an amplitude proportional to the varying amplitude of the direct current.

Heretofore, however, the application of such modulators was limited in practice to relatively high direct voltages because of the zero-point error voltage resulting from the inductive effect of the modulating magnetic flux upon the loop constituted by the Hall-electrode leads. This will be realized if it is taken into account that the output leads 6 and 13 constitute a secondary loop in which a voltage is induced by the varying flux produced by the coil 4. The resulting error voltage virtually precludes using very small signal voltages in the order of micro volts. Even extreme care in the production of such devices and the utilization of various compensating expedients fails to satisfactorily eliminate the zero-point error.

It is an object of our invention to devise a Hall-type modulator which greatly minimizes the zero-point error voltage thus rendering it nil or negligible for most purposes.

Our invention is based upon comprehensive investigation of the zero-error problem from which we have drawn the conclusion that in the known modulators of this type some of the flux in the magnetic circuit necessarily passes through the above-mentioned loop formed by the Hall-electrode leads. According to the invention, however, it is possible to provide for a substantially field-free loop.

To this end, and in accordance with our invention, we provide a Hall modulator, generally of the type described above, with a magnetic circuit which, aside from the field gap in which the Hall plate is located, is at least partly open outside of the magnetizing coil. That is, we interrupt the magnetic circuit, constituted by a corresponding core structure, so that the magnetic flux is forced to emerge out of the core structure in form of a stray field. We further place or displace the loop, formed by the Hall-electrode leads, to a position in the external stray field where the voltage induced in the loop by the magnetic field is suppressed.

According to another, more specific feature, we provide the magnetic circuit or core structure with one or more slots extending transverse to the direction of the magnetic field lines, and we dispose the loop in the slot.

A particularly simple and highly sensitive balancing or compensating effect, however, is afforded by means of a fully open magnetic circuit because in this case the variation of the effective flux is not so greatly dependent on the position or positional displacement of the loop as in a slotted magnetic circuit. Although the magnetic circuit is open, an adequate sensitivity can be obtained by using a Hall plate in the form of a thin semiconductor layer, such as a layer etched down to a thickness of approximately 3 to 5 microns.

Semiconductor compounds of the $A^{III}B^{V}$ type, especially indium antimonide and indium arsenide, are particularly well applicable for semiconductor wafers or layers in modulators according to the invention.

The above-mentioned and further features of the invention, as well as its mode of operation, will be described presently with reference to the embodiments shown by way of example in FIGS. 1 to 4 of the drawing.

According to FIGS. 1 and 2, a ferrite bridge member 3 which carries the modulator winding 4 is inserted between two ferrite plates 1 and 2. The member 3 and the plates 1, 2 jointly form a magnetizable core structure substantially of H-shaped cross section. The semiconducting Hall-plate layer 10 is located in the field gap between the member 3 and the ferrite plate 1. The modulating alternating current is supplied to the modulator winding 4 by means of twisted supply leads 5. The control current, constituting the magnitude to be modulated, is supplied by means of twisted leads 7 and 25 from terminals 26 and 27 of a current source to the terminals of the Hall plate. The twisted Hall-electrode leads 6 and 13 and the twisted current-supply leads 7 and 25 form respective movable, displaceable or shiftable loops around the ferrite plate 1. The two loops extend relative to each other at an angle of 90°. The modulated output voltage is available at terminals 8 and 9. It will be understood that the illustrations are on enlarged scale. The actual length of the ferrite plates 1 and 2 may be approximately 10 mm., all other dimensions being proportionate.

For improved mechanical strength, two spacer bars 11 and 12 of non-magnetic material are inserted between the two ferrite plates 1 and 2 at the respective open sides of the magnetic circuit. In this manner a rugged mechanical structure is secured. In FIG. 2 the return lead of the Hall-electrode loop, passing across the top surface of the ferrite plate 1, appears in cross section at 13.

FIG. 3a serves to schematically represent the field distribution of a modulator according to the invention compared with the field distribution in a modulator of the known type represented in FIG. 3b. Due to manufacturing tolerances, the loop formed by the Hall-electrode leads has a somewhat asymmetrical position which, for the purpose of explanation, is shown exaggerated in FIGS. 3a and 3b where the Hall electrode is denoted by 14. If the magnetic circuit is open according to FIG. 3a, the flux produced by the modulator winding 4, and schematically shown by field lines 15, emerges out of the core structure into the ambient atmosphere so that no line of flux is closed upon itself within the ferromagnetic circuit. Assume that the return lead 13 of the Hall-electrode loop has the position indicated by A. Then a flux line will pass through the loop as will be apparent from FIG. 3a. This results in the occurrence of a zero-point error in the output voltage of the modulator. When the loop is shifted to position B, the line of flux no longer passes through the loop so that the zero-point error is compensated. With an open magnetic circuit and irrespective of the position of the electrode 14, the return lead 13 can in each case be so positioned that the entire flux passing through the loop is equal to zero, thus suppressing the induced voltage.

Such suppression is impossible with a modulator whose magnetic circuit is closed according to FIG. 3b. Regardless of the position in which the return lead 13 is placed along the magnetic circuit, one of the possible locations being denoted by B in FIG. 3b, some of the flux in the magnetic circuit must necessarily pass through the loop so that a compensation of the zero-point error cannot be attained.

As menioned above, in some cases the desired compensation of the zero error can also be achieved by providing the magnetic circuit with a slot transverse to the flux direction. This will be understood if it is taken into account that such a transverse slot is essentially a partial opening of the magnetic circuit.

FIG. 4 illustrates a complete modulator device according to the invention, corresponding components being denoted by the same reference numerals as in FIGS. 1, 2 and 3a respectively. The magnetic core structure is placed upon a copper plate 17 which constitutes a heat sink or thermal short-circuit along the length of the modulator. A mica layer 16 is inserted for heat insulation between the copper plate 17 and the core structure. By virtue of the copper plate, the occurrence of thermoelectric forces which may likewise cause zero-point errors is also avoided. The modulator is provided with a housing 18 of magnetizable material to act as a shielding for eliminating disturbance by extraneous magnetic fields. The housing 18 is attached to a base plate 19. Plate 19 and plate 17 are provided with bores 20 and 21 close to the right and left respectively of the magnetic core structure. The bores in the copper plate 17 are threaded, and calibrating bolts 22 of magnetizable material, for example ferrite, can be screwed into the threaded bores. The calibration and compensation of the modulator is facilitated if the zero-error is initially compensated only coarsely by displacing the loop of the Hall-electrode leads. Then the loop is mechanically fixed to the modulator core structure, and the ultimate fine calibration is thereafter effected by inserting and adjusting a compensating screw 22.

To those skilled in the art it will be obvious upon a study of this disclosure that modulators according to the invention can be modified in various respects without departure from the essential features of the invention according to which the magnetic circuit must be open at least to a sufficient extent to permit compensating the flux-induced voltage in the Hall-electrode loop by displacement of that loop. The invention, therefore, can be given embodiments other than particularly illustrated and described herein, without departing from the scope of the claims annexed hereto.

We claim:

1. A modulator of the Hall type, comprising a Hall plate having a pair of spaced current input terminals and two Hall voltage electrodes, a magnetizable core structure forming a magnetic circuit and having a field gap in which said Hall plate is located, an excitation coil on said structure, one of said pair of input terminals and coil serving to supply the modulating signal and the other to supply carrier frequency, and two output leads for furnishing modulated output voltage, said two leads being connected to said respective Hall voltage electrodes and jointly forming a movable loop, said magnetic circuit being at least partially open outside of said field gap and coil whereby the magnetic flux of said coil produces a stray field outside of said core structure, and said loop being movable in said stray field to a position where the flux-induced voltage in said loop is suppressed.

2. A modulator of the Hall type, comprising a Hall plate having a pair of spaced current input terminals and two Hall voltage electrodes, a substantially H-shaped magnetizable core structure forming two interlinked magnetic circuit branches of symmetrical configuration of which each is open at the side away from the common middle portion of the H-shape, an excitation coil coaxially mounted on said middle portion for producing magnetic flux passing through said middle portion and forming a stray field emerging out of said core structure, said Hall plate being interposed in said middle portion, an one of said pair of input terminals and coil serving for supplying the modulating signal and the other for supplying carrier frequency, and two output leads for furnishing modulated output voltage, said two leads being connected to said respective Hall voltage electrodes and jointly forming a movable loop, said loop being movable in said stray field to a position where the flux-induced voltage in said loop is suppressed.

3. In a modulator according to claim 2, said H-shaped core structure comprising two plate members magnetically interconnected by said middle portion, and said Hall plate consisting of a semiconductor layer of 3 to 5 microns thickness interposed between one of said plate members and said middle portion.

4. In a modulator according to claim 2, said H-shaped core structure comprising two plate members of ferrite magnetically interconnected by said middle portion, said middle portion also consisting of ferrite, said Hall plate consisting of a semiconductor layer between one of said plate members and said middle portion, a lead connected to each of said current input terminals and forming another loop extending substantially around one of said ferrite plate members, and said movable loop of Hall voltage electrode leads extending substantially around said one ferrite plate member at an angle of 90° to said other loop.

5. A modulator according to claim 2, comprising two spacer pieces of rigid non-magnetizable material joined with said H-shaped core structure and mechanically closing the respective magnetically open ends of said magnetic circuit branches.

6. A modulator according to claim 5, comprising a shielding enclosure, and a screw bolt of magnetizable material adjustably joined with said enclosure and disposed adjacent to said core structure for calibration of the modulator.

References Cited by the Examiner

UNITED STATES PATENTS

| | | | |
|---|---|---|---|
| 2,532,157 | 11/1950 | Evans. | |
| 2,877,309 | 3/1959 | Henisch | 330—6 X |
| 3,097,296 | 7/1963 | Chasmar et al | 330—6 X |

HERMAN KARL SAALBACH, *Primary Examiner.*

ALFRED L. BRODY, *Examiner.*